(12) United States Patent
Lee et al.

(10) Patent No.: US 9,535,600 B2
(45) Date of Patent: Jan. 3, 2017

(54) TOUCH-SENSITIVE DEVICE AND TOUCH-BASED FOLDER CONTROL METHOD THEREOF

(75) Inventors: Sang Ki Lee, Seoul (KR); Su Jung Youn, Gyeonggi-do (KR); Kyoung Ae Lim, Seoul (KR); Su Mi Shim, Gyeonggi-do (KR); Wan Soo Lim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 787 days.

(21) Appl. No.: 13/195,930

(22) Filed: Aug. 2, 2011

(65) Prior Publication Data

US 2012/0030628 A1 Feb. 2, 2012

(30) Foreign Application Priority Data

Aug. 2, 2010 (KR) ........................ 10-2010-0074547

(51) Int. Cl.
*G06F 3/048* (2013.01)
*G06F 3/0488* (2013.01)
*G06F 3/0486* (2013.01)
*G06F 3/0481* (2013.01)

(52) U.S. Cl.
CPC ......... *G06F 3/04883* (2013.01); *G06F 3/0486* (2013.01); *G06F 3/04817* (2013.01)

(58) Field of Classification Search
CPC G06F 3/0486; G06F 3/04817; G06F 3/04842; G06F 3/0481

USPC ........................................................ 715/835
See application file for complete search history.

(56) References Cited

U.S. PATENT DOCUMENTS

| 5,428,734 | A | * | 6/1995 | Haynes et al. ................. 715/769 |
| 5,461,710 | A | | 10/1995 | Bloomfield et al. |
| 5,608,860 | A | * | 3/1997 | Fitzpatrick et al. .......... 715/826 |
| 5,801,699 | A | * | 9/1998 | Hocker et al. ................ 715/837 |
| 6,104,393 | A | * | 8/2000 | Santos-Gomez ............. 715/763 |
| 6,212,577 | B1 | * | 4/2001 | Stern et al. ................... 719/329 |

(Continued)

FOREIGN PATENT DOCUMENTS

| JP | 6-202841 A | 7/1994 |
| JP | 2004-341886 A | 12/2004 |

(Continued)

OTHER PUBLICATIONS

Hanna et al., "Icons which include File Folder Symbols", Technical Disclosure Bulletin, v. 36, n. 6B, pp. 363-364, Jun. 1993.*

(Continued)

*Primary Examiner* — Jennifer To
*Assistant Examiner* — Joseph R Burwell
(74) *Attorney, Agent, or Firm* — Cha & Reiter, LLC

(57) ABSTRACT

A touch-sensitive device has a touch-based input interface and includes a touch-based folder control for creating, moving or arranging folders in response to an input of a touch-based user interaction. The touch-sensitive device receives an input from a touch-based user interaction on a home screen of the touch sensitive device and creates a new folder in response to at least one object selected by the user interaction. The touch based folder control visually disposes the new folder at a specific place on the home screen.

20 Claims, 13 Drawing Sheets

(56) References Cited

U.S. PATENT DOCUMENTS

| | | | |
|---|---|---|---|
| 7,055,106 B2* | 5/2006 | Shibata | 715/837 |
| 8,060,833 B2* | 11/2011 | Zagorski | 715/769 |
| 8,407,613 B2* | 3/2013 | Hope | 715/769 |
| 2003/0028553 A1* | 2/2003 | Kondo | 707/200 |
| 2003/0160825 A1* | 8/2003 | Weber | 345/769 |
| 2003/0222915 A1* | 12/2003 | Marion et al. | 345/769 |
| 2004/0001094 A1* | 1/2004 | Unnewehr et al. | 345/769 |
| 2004/0070609 A1* | 4/2004 | Estrada | 345/751 |
| 2005/0060653 A1* | 3/2005 | Fukase et al. | 715/724 |
| 2005/0177796 A1 | 8/2005 | Takahashi | |
| 2006/0129945 A1* | 6/2006 | Dettinger et al. | 715/769 |
| 2006/0136833 A1* | 6/2006 | Dettinger et al. | 715/769 |
| 2007/0016872 A1* | 1/2007 | Cummins et al. | 715/769 |
| 2007/0157097 A1* | 7/2007 | Peters | 715/764 |
| 2008/0229222 A1 | 9/2008 | Kake | |
| 2008/0235610 A1* | 9/2008 | Dettinger et al. | 715/769 |
| 2008/0270926 A1* | 10/2008 | Dettinger et al. | 715/769 |
| 2009/0058821 A1 | 3/2009 | Chaudhri et al. | |
| 2009/0228820 A1 | 9/2009 | Kim et al. | |
| 2009/0234721 A1* | 9/2009 | Bigelow et al. | 715/753 |
| 2009/0259959 A1* | 10/2009 | Grotjohn et al. | 715/769 |
| 2009/0288028 A1* | 11/2009 | Gohda et al. | 715/769 |
| 2009/0293008 A1* | 11/2009 | Fujii et al. | 715/769 |
| 2009/0327975 A1 | 12/2009 | Stedman | |
| 2010/0017734 A1* | 1/2010 | Cummins et al. | 715/769 |
| 2010/0058182 A1 | 3/2010 | Jung | |
| 2010/0066688 A1 | 3/2010 | Jeon | |
| 2010/0070900 A1* | 3/2010 | Cummins et al. | 715/769 |
| 2010/0088641 A1 | 4/2010 | Choi | |
| 2010/0214571 A1* | 8/2010 | Luo | 715/769 |
| 2010/0229129 A1* | 9/2010 | Price et al. | 715/863 |
| 2010/0257472 A1* | 10/2010 | Zhang | 715/769 |
| 2011/0102458 A1 | 5/2011 | Takiguchi et al. | |
| 2011/0163970 A1* | 7/2011 | Lemay | 715/863 |
| 2011/0197153 A1* | 8/2011 | King et al. | 715/769 |
| 2011/0246918 A1* | 10/2011 | Henderson | 715/769 |
| 2011/0252374 A1* | 10/2011 | Chaudhri | 715/835 |
| 2012/0030623 A1* | 2/2012 | Hoellwarth | 715/811 |
| 2012/0036460 A1* | 2/2012 | Cieplinski et al. | 715/769 |
| 2012/0084689 A1* | 4/2012 | Ledet et al. | 715/769 |

FOREIGN PATENT DOCUMENTS

| | | |
|---|---|---|
| JP | 2005-198064 A | 7/2005 |
| JP | 2008-90362 A | 4/2008 |
| JP | 2008-234055 A | 10/2008 |
| JP | 2009-176217 A | 8/2009 |
| JP | 2009-277192 A | 11/2009 |
| KR | 10-2007-0107892 A | 11/2007 |
| KR | 10-2010-0048372 A | 5/2010 |
| KR | 10-2010-0057358 A | 5/2010 |
| WO | 2009/032750 A1 | 3/2009 |
| WO | 2010/041826 A2 | 4/2010 |

OTHER PUBLICATIONS

"Vacuum Folder Concept", http://milliondollarideastore.com/2010/03/vacuum-folder-concept/, Mar. 30, 2010.*

Baudisch et al., "Drag-and-Pop and Drag-and-Pick: techniques for accessing remote screen content on touch- and pen-operated systems", Interact'03: IFIP International Conference on Human Computer Interaction, pp. 57-64, Sep. 2003.*

Bezerianos et al., "The Vacuum: Facilitating the Manipulation of Distant Objects", CHI 2005, pp. 361-370, Apr. 2005.*

Dan Frakes, Hands on with iOS 4 Folders, MacWorld, Jun. 21, 2010 http://www.macworld.com/article/1152168/ios4folders.html.

iPhone 4 & iOS 4 Main Features All Catalog, iPhonePeople Summer-Autumn, Japan, Ascii Corporation Media Weeks, Jul. 29, 2010, 1st Edition, p. 19.

Computer Hope, How to Create a Directory/Folder, Published Jul. 15, 2010 as per Wayback Machine https://web.archive.org/web/20100715164434/http://www.computerhope.com/issues/ch000742.htm.

Japanese Notification of Reasons for Refusal dated Mar. 7, 2016.

Korean Intellectual Property Office Notification of Preliminary Rejection dated Apr. 28, 2016.

Joe Levi, How to Speed Up Your Android: Organize Your Home Screens Using Folders, Pocketnow, Mar. 24, 2010, XP055282938, pp. 1-2.

European Search Report dated Jul. 4, 2016.

* cited by examiner

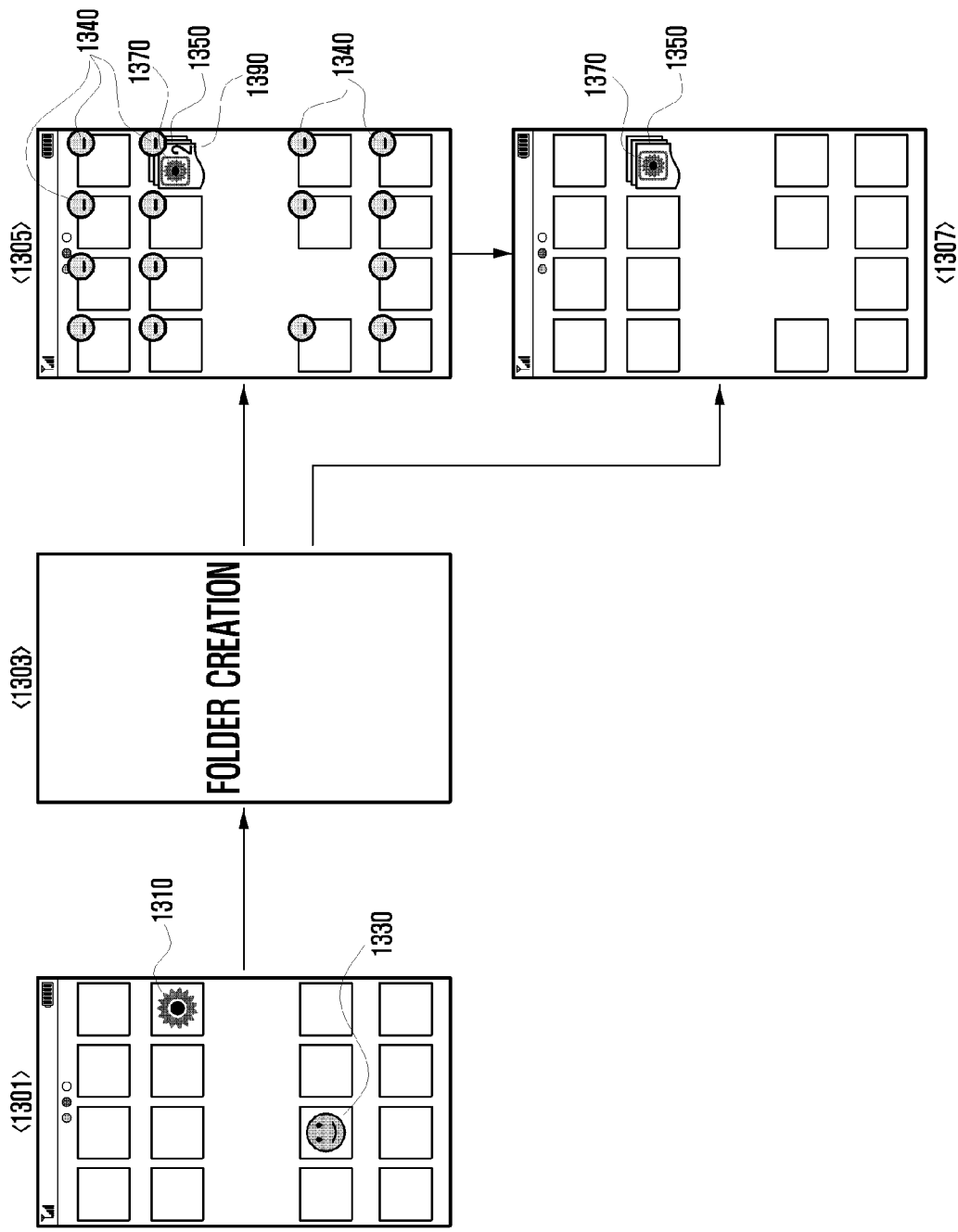

TOUCH-SENSITIVE DEVICE AND TOUCH-BASED FOLDER CONTROL METHOD THEREOF

CLAIM OF PRIORITY

This application claims the benefit under 35 U.S.C. 119 (a) from a Korean patent application filed in the Korean Intellectual Property Office on Aug. 2, 2010 and assigned Serial No. 10-2010-0074547, of which the entire disclosure is hereby incorporated by reference in its entirety.

BACKGROUND OF THE INVENTION

1. Field of the Invention

The present invention relates in general to a touch-sensitive device with a touch-based input interface and, more particularly, to a touch-sensitive device and a touch-based folder control to create, move, or arrange folders responsive to a touch-based user interaction input.

2. Description of the Related Art

As a result of advances in related technologies, a great variety of mobile devices are more in demand today. Particularly, mobile devices extend beyond their respective traditional fields and have developed toward a mobile convergence that services a variety of other needs. Mobile communication device for example besides traditional communication functions such as a voice call and an SMS (short message service), include various essential or optional such as a portable broadcasting (e.g., DMB (digital multimedia broadcasting) or DVB (digital video broadcasting)), a digital music play (e.g., MP3 (MPEG audio layer-3)), a digital camera, a wireless Internet, a dictionary, and the like.

A touch-sensitive device can have a touch screen that serves as both a display unit and an input unit to generate customers' interest. A touch-sensitive device can include a full touch screen eliminating the need for a mechanical keypad where the device can be used and controlled by using a touch-based input interface.

It would be desirable to realize various functions from either hardware or software aspects for a touch screen device. In particular, it would be desirable to offer user-friendly user interface (UI) environments to a touch-sensitive device. In order to meet such tendency, new functions and approaches to improve user's convenience are continuously developed and introduced in the art.

BRIEF SUMMARY OF THE INVENTION

Accordingly, the present invention is to address the above-mentioned problems and/or disadvantages and to offer at least the advantages described below.

The present invention provides a touch sensitive device with a touch based interface.

The present invention further provides a touch sensitive device having a touch based folder control for creating, moving, or arranging folders responsive to an input from a touch based user interaction.

The present invention provides an additional function for user's convenience in a touch-sensitive device.

The present invention realizes user interaction (UI) environments by permitting a new folder to be created at a specific place in response to an input of a touch-based user interaction in a touch-sensitive device.

The present invention provides a touch-based folder control method for creating an empty or group folder in response to at least one object selected by a touch-based user interaction on a display screen and for visually disposing the new folder at any place on the screen.

The present invention provides a touch-sensitive device having a user-friendly touch interface that allows easy and convenient creation and control of a new folder.

The present invention provides a touch-based folder control in a touch-sensitive device that receives an input of a touch-based user interaction on a home screen; creates a new folder in response to at least one object selected by the user interaction; and visually disposes the new folder at a specific place on the home screen.

The newly created folder may be created in response to a combination of a plurality of objects selected by the user interaction based on a multi-touch; and in response to a single object selected by the user interaction based on a single-touch.

The creation of the new folder may include creating the empty folder when the object selected by the user interaction is an empty place, and creating the group folder having at least one icon when the object selected by the user interaction is at least one icon.

The present invention provides a touch-sensitive device comprising a touch screen configured to display a home screen having at least one object and to receive an input of a touch-based user interaction through at least one object; and a control unit configured to create an empty folder or a group folder having at least one icon in response to the at least one object selected by the user interaction and to visually dispose the created folder at a specific place on the home screen by a predefined rule.

The touch-sensitive device of the present invention permits a new folder to be simply created and controlled depending on a touch-based user interaction on a home screen. A touch-based user interaction simplifies a folder creation procedure and also realizes optimum environments for a folder creation. Techniques disclosed herein may be favorably and widely applied to any kinds of devices that employ a touch-based input interface. In addition, such techniques may promote usability, accessibility and competitiveness of a touch-sensitive device.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above features and advantages of the present invention will become more apparent from the following detailed description in conjunction with the accompanying drawings, in which like reference numerals denote like elements or features, wherein:

FIG. 13 is a screenshot illustrating an example of offering information about a created folder in a touch-sensitive device in accordance with an exemplary embodiment of the present invention.

DETAILED DESCRIPTION OF EXEMPLARY EMBODIMENTS

Figure 1:
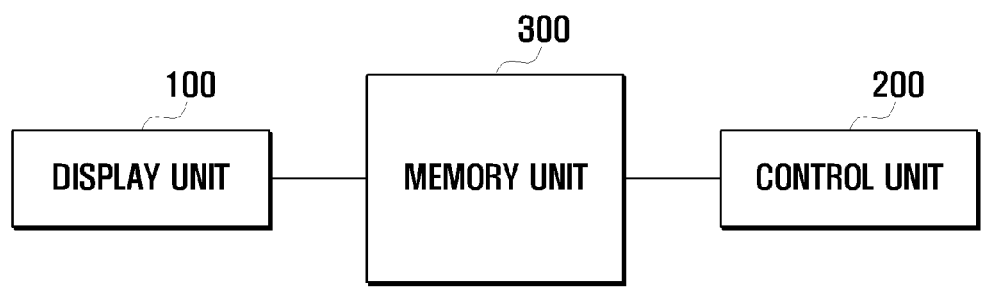
FIG. 1 is a block diagram illustrating a schematic configuration of a touch-sensitive device in accordance with an exemplary embodiment of the present invention.

Exemplary, non-limiting embodiments of the present invention will now be described more fully with reference to the accompanying drawings of FIGS. 1-13. This invention may, however, be embodied in many different forms and should not be construed as limited to the exemplary embodiments set forth herein. Rather, the disclosed embodiments are provided so that this disclosure will be thorough and complete, and will fully convey the scope of the invention to those skilled in the art. The principles and features of this invention may be employed in varied and numerous embodiments without departing from the scope of the invention.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

In one aspect of the present invention a touch-sensitive device has a touch-based input interface and includes an apparatus for supporting a function to create a new folder and also includes a control method therefor. Embodiments of the present invention may create a new folder in response to either a user interaction based on a multi-touch or to a single-touch on a home screen offered in a touch-sensitive device, and may dispose a created folder to a specific place on a home screen by a predefined rule.

In particular, embodiments of the present invention may analyze an object that is selected by a user interaction on a home screen and then based upon a selected object or a combination thereof, create an empty folder or a group folder containing at least one icon or folder. Such an embodiment of the present invention may create an empty or group folder in response to a combination of a plurality of objects that correspond to a multi-touch based user interaction. Also, this embodiment of the present invention may create an empty or group folder in response to a single object that corresponds to a single-touch based user interaction rather than a multi-touch based user interaction. Additionally, this embodiment of the present invention may create an empty folder when an object selected by a user interaction is an empty place, and may create a group folder having at least one icon when an object selected by a user interaction is the at least one icon. Thus this embodiment of the present invention may create an empty folder or a group folder containing at least one icon or folder based upon on an object that is selected by a user interaction.

In embodiments of the present invention, a user interaction may be implemented in a specific form predefined for a folder creation. An input form of user interaction is described later. In embodiments of this invention, a home screen refers to a specific screen that visually offers a shortcut icon for executing an application supported by a touch-sensitive device, a widget icon for activating a widget, a folder, and the like. In embodiments of this invention, an object includes an icon offered to a home screen, a folder offered to a home screen, an empty place where neither icon nor folder is disposed on a home screen, and a folder creation region offered to a part of a home screen.

A touch-sensitive device according to the embodiments of the present invention and its operation control method is fully described hereinafter with reference to FIGS. 1 to 13. The following embodiments are, however, exemplary only and are intended to be considered as non-limiting illustrations of the present invention. As will be understood by those skilled in the art, any other alternative embodiments may be favorably used.

FIG. 1 is a block diagram illustrating a schematic configuration of a touch-sensitive device in accordance with an exemplary embodiment of the present invention.

Referring to FIG. 1, the touch-sensitive device includes a display unit 100, a memory unit 200 and a control unit 300. Additionally, the touch-sensitive device may include a radio frequency unit for performing a communication function; an audio processing unit having a microphone and a speaker; a digital broadcast module for receiving and playing digital broadcasting such as DMB (digital multimedia broadcasting) or DVB (digital video broadcasting); a camera module for taking a photo or recording a video; a Bluetooth communication module for performing a Bluetooth communication function; an Internet communication module for performing an Internet communication function; a touch pad for a touch-based input, a key input unit for a mechanical key input, and the like. Since these elements are well known in the art, related illustration and description will be omitted herein.

The display unit 100 provides various execution screens of applications supported in the touch-sensitive device. Many execution screens associated with several essential or optional functions may be provided, for example, such as but not limited to SMS, e-mail, Internet, multimedia, search, communication, e-book, video play, camera, image viewer, TV (e.g., DMB or DVB), music play (e.g., MP3), widget, memo, game, etc. The display unit 100 may be formed of LCD (liquid crystal display) or any other equivalent such as OLED (organic light emitting diodes) or AMOLED (active matrix OLED). The display unit 100 may represent a screen view in a widthwise mode (i.e., a landscape mode) or in a lengthwise mode (i.e., a portrait mode), depending on a positional direction of the touch-sensitive device.

In one embodiment of the present invention, the display unit 100 includes a touch-based input interface. Specifically by using a touch screen, the display unit 100 permits a touch-based user interaction input; creates an input signal corresponding to a user interaction input; and sends it to the control unit 300. Also, in an embodiment of the present invention, the display unit 100 visually offers a home screen as mentioned above and represents a folder created in response to a touch-based user interaction input at a specific place of the home screen. A related description will be given below.

The memory unit 200 stores a variety of programs and related data that are executed and processed in the touch-sensitive device; and may be composed of at least one volatile memory and nonvolatile memory. For instance, the memory unit 200 may store continuously or temporarily the operating system of the touch-sensitive device, programs and data related to a display control of the display unit 100, programs and data related to an input control through the display unit 100, programs and data related to a folder creation function, programs and data related to an edit mode for a folder creation in response to a user interaction, and the like.

The control unit 300 controls the entire operations of the touch-sensitive device. Particularly, the control unit 300 may control operations related to a folder creation function. For example, when a touch-based user interaction occurs on the home screen, the control unit 300 determines if the user interaction is for a folder creation or for a normal function control. At this time, the control unit 300 may perform the above determination by analyzing whether the user interaction is inputted according to a specific rule predefined for a folder creation. For example, if a user's touch is inputted on an object in the home screen, held more than a given time, and then released, the control unit 300 may recognize that such a user interaction is for a folder creation.

After recognizing a user interaction for a folder creation, the control unit 300 creates an empty folder or a group folder containing at least one icon (or folder), depending on an object or a combination thereof selected by the user interaction.

In one example, when any user interaction is inputted in a multi-touch form and touched points have at least one icon (or folder), the control unit 300 creates a group folder containing the above touched icon (or folder). In this example, the touched icon (or folder) is moved to the group folder and removed from the home screen. If any user interaction is inputted in a multi-touch form and all touched points are empty places having no icon (or folder), the control unit 300 creates an empty folder that has no icon (or folder).

According to another case, when any user interaction is inputted in a single-touch form and a touched point has an icon (or folder), the control unit 300 creates a group folder that contains the above touched icon (or folder). In this case, the touched icon (or folder) is moved to the group folder and removed from the home screen. If any user interaction is inputted in a single-touch form and a touched point is an empty place having no icon (or folder), the control unit 300 creates an empty folder that has no icon (or folder).

In still another example, when any user interaction is inputted in a single-touch form and this single-touch is moved from a folder creation region of the home screen to an empty place in a display region of the home screen through a drag, a flick, a drag-and-drop, etc., the control unit 300 creates an empty folder that has no icon (or folder). If any user interaction is inputted in a single-touch form and this single-touch is moved from the folder creation region to any icon (or folder) in the display region, the control unit 300 creates a group folder that has the icon (or folder). Also, if any user interaction is inputted in a single-touch or multi-touch form and this touch is moved from an empty space in the display region to the folder creation region, the control unit 300 creates an empty folder. If any user interaction is inputted in a single-touch multi-touch form and this touch is moved from at least one icon (or folder) in the display region to the folder creation region, the control unit 300 creates a group folder that has the icon (or folder).

The above-discussed examples are described in detail below. In this disclosure, a folder is divided into an empty folder and a group folder for the sake of convenience.

Additionally, the control unit 300 visually disposes a created folder to a proper location of the home screen according to a predefined rule. For instance, the control unit 300 may dispose a created folder (an empty folder or a group folder) to an empty place where neither icon nor folder is disposed on the home screen. Also, the control unit 300 may dispose a created folder (an empty folder or a group folder) to a specific place where a user interaction occurs. A related description is described below.

Besides, the control unit 300 performs a variety of control operations in connection with normal functions of the touch-sensitive device. For instance, the control unit 300 may control the execution of an application and the display of related data. Furthermore, the control unit 300 may receive input signals corresponding to various input forms supported by a touch-based input interface and then control corresponding functions. Also, the control unit 300 may control a folder management function such as deleting a created folder, changing a folder name, and the like.

Meanwhile, the touch-sensitive device shown in FIG. 1 may be applied to any types of mobile device having a touch-based input interface, including by way of non-limiting example, a bar type, a folder type, a slide type, a swing type, a flip type, etc. Additionally, the touch-sensitive device of the present invention may include any of communication devices, multimedia players and their application equipment. For instance, the touch-sensitive device may include various mobile communication terminals based on various communication protocols, a portable multimedia player (PMP), a digital broadcasting player, a personal digital assistant (PDA), a music player (e.g., an MP3 player), a portable game console, a smart phone, etc.

Additionally, a folder control method according to a user interaction using a touch-based input interface of this invention may be applied to any other devices such as a TV, an LFD (large format display), a DS (digital signage), a media pole, a personal computer, a notebook, etc.

Figure 2:
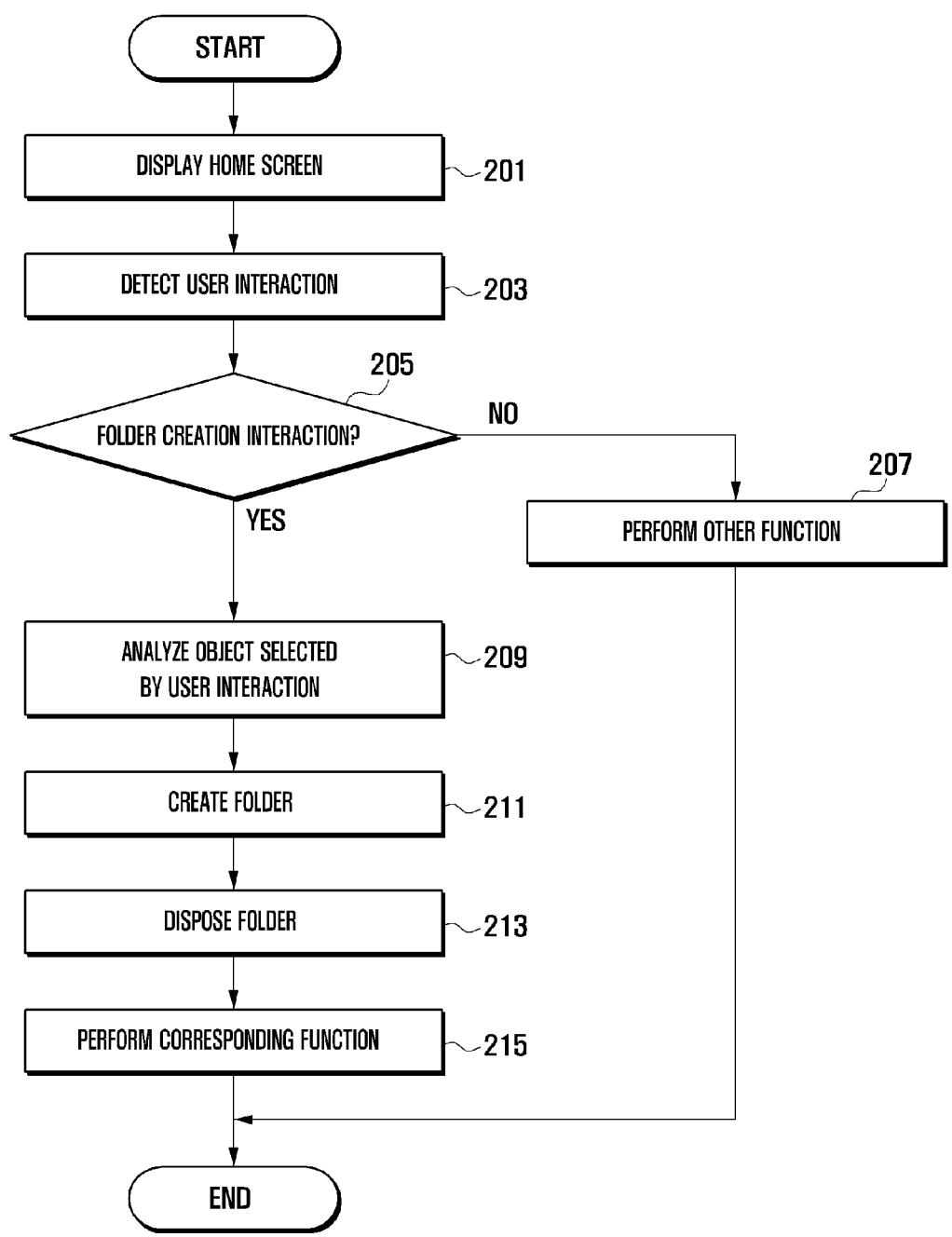
FIG. 2 is a flow diagram illustrating a method for a touch-based folder control in a touch-sensitive device in accordance with an exemplary embodiment of the present invention.

FIG. 2 is a flow diagram illustrating a method for a touch-based folder control in a touch-sensitive device in accordance with an exemplary embodiment of the present invention.

Referring to FIG. 2, the control unit 300 may control the display of the home screen (step 201). For instance, the control unit 300 may control the display of a screen having no icon nor folder, of a screen having at least one icon or folder, of a screen having a plurality of icons and folders arranged in a block form, of a screen having a plurality of icons and folders arranged in a list form, and the like.

Next, the control unit 300 may detect a user interaction inputted on the home screen (step 203). Specifically, when any touch-based user interaction is inputted on the home screen, the control unit 300 detects an input of the user interaction by receiving a corresponding input signal. In the touch-sensitive device, a user interaction may be inputted through various input forms using a touch-based input interface. For instance, a user interaction may include a single-touch input such as a tap input, a drag input, a drag-and-drop input, a swing input, or a flick input, and a touch-and-hold input based on a single-touch. Also, a user interaction may include a multi-touch input and a touch-and-hold input based on a multi-touch.

When any user interaction is detected, the control unit 300 determines whether the user interaction is for a folder creation or for a normal function control (step 205). Specifically, the control unit 300 may perform the above determination by analyzing whether the user interaction is inputted according to a specific rule predefined for a folder creation. For instance, if a multi-touch is inputted on two objects in the home screen, held more than a given time (namely a touch-and-hold input based on a multi-touch), and then released, the control unit 300 may recognize that this user interaction is for a folder creation. If a single-touch is inputted on an empty place in the home screen, held more than a given time (namely a touch-and-hold input based on a single-touch), and then released, the control unit 300 may recognize that this user interaction is for a folder creation. If a drag is inputted from a folder creation region predefined in the home screen to a display region of the home screen, the control unit 300 may recognize that this user interaction is for a folder creation. Besides, any other various user interactions may be used for a folder creation. A detailed description will be given below.

If a user interaction is for a normal function control (answer No of step 205), the control unit 300 may perform any other function in response to the user interaction (step 207). For instance, if a user interaction is a double tap on a specific icon, the control unit 300 may execute an application corresponding to the icon and then control a subsequent screen display.

If a user interaction is for a folder creation (answer Yes of step 205), the control unit 300 analyzes an object selected by the user interaction (step 209) and then creates a new folder in response to the selected object (step 211). For instance, depending on a selected object or a combination of selected objects, the control unit 300 may create an empty folder or a group folder having at least one icon (or folder).

Specifically, when a user interaction is inputted in a multi-touch form and touched points have at least one icon (or folder), the control unit 300 may create a group folder that contains the above touched icon (or folder). If a user interaction is inputted in a multi-touch form and all touched points are empty places having no icon (or folder), the control unit 300 may create an empty folder that has no icon (or folder). Also, when a user interaction is inputted in a single-touch form and a touched point has an icon (or folder), the control unit 300 may create a group folder that contains the above touched icon (or folder). If a user interaction is inputted in a single-touch form and a touched point is an empty place having no icon (or folder), the control unit 300 may create an empty folder that has no icon (or folder). And also, when a user interaction is inputted in a single-touch form and this single-touch is moved from a folder creation region of the home screen to an empty place in a display region of the home screen (or from the empty place to the folder creation region), the control unit 300 may create an empty folder. If a user interaction is inputted in a single-touch form and this single-touch is moved from the folder creation region to any icon (or folder) in the display region (or from any icon to the folder creation region), the control unit 300 may create a group folder that has the icon (or folder). Various examples of creating a new folder (an empty folder or a group folder) according to an object or a combination of objects selected by a user interaction will be fully described below.

After creating a new folder, the control unit 300 visually disposes the new folder at a specific place on the home screen (step 213). For instance, the new folder may be disposed at an empty place of the home screen or at a place where a user interaction occurs. Related examples are fully described below.

Next, the control unit 300 may perform a corresponding function (step 215). For instance, the control unit 300 may change a folder name, change a folder position, or move an icon (or folder) arranged in the home screen to the created folder, depending on a user interaction.

Figure 3:
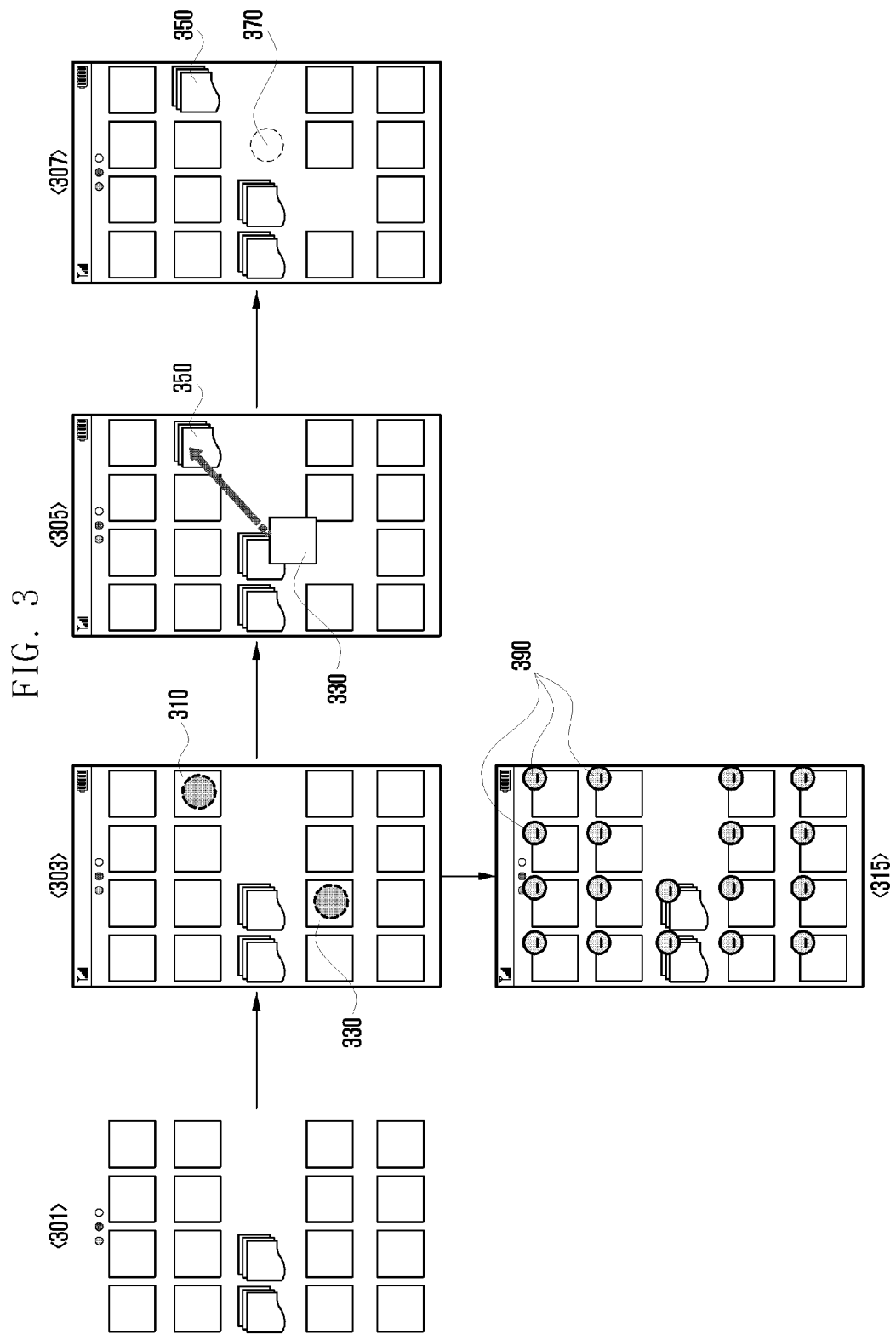
FIGS. 3 to 10 are screenshots illustrating examples of creating a folder in response to a touch-based user interaction in a touch-sensitive device in accordance with exemplary embodiments of the present invention.

FIG. 3 is a screenshot illustrating an example of creating a folder in response to a touch-based user interaction in a touch-sensitive device in accordance with an exemplary embodiment of the present invention.

As shown in FIG. 3, when a plurality of icons and folders are arranged in a block form on the home screen, a multi-touch user interaction is inputted on at least two objects and thereby a folder is created. In the present invention, two objects selected by a multi-touch user interaction may be two icons, an icon and a folder, two folders, an icon and an empty place, or a folder and an empty place. In FIG. 3 case, objects selected by a multi-touch interaction are two icons.

Referring to FIG. 3, the home screen is displayed on the display unit 100 as indicated by a reference number 301. A touch-based user interaction for a folder creation may be inputted on the home screen. For instance, as indicated by a reference number 303, a multi-touch may be inputted on the first icon 310 and the second icon 330. This multi-touch that selects the first and second icons 310 and 330 may be held more than a given time and then released.

When a user interaction is detected from the home screen, the control unit 300 creates a folder in response to the user interaction. For instance, as indicated by a reference number 305, a new folder 350 may be created at the place of the first icon 310. At this time, in order to offer a visual effect (namely to give a graphical feedback to a user), the control unit 300 may initially offer the new folder 350 in a semi-transparent form. Additionally, the control unit 300 may further offer a visual effect by which the second icon 330 moves to the new folder 350 and then disappears into the new folder 350. Namely, when any user interaction is for a folder creation, the new folder 350 appears dimly at the place of the first icon 310 as indicated by a reference number 305 and then the second icon 330 moves to and disappears into the new folder 350 by a visual effect. The place of the second icon 330 is therefore changed to an empty place.

The control unit 300 may remove a semitransparent effect temporarily applied to the new folder 350 and instead apply a clear form to the new folder 350. Namely, when a visual effect is finished, the new folder 350 may be disposed in a complete form at the place of the first icon 310, replacing the first icon 310, as indicated by a reference number 307. At this time, the first and second icons 310 and 330 are moved into the new folder 350 and visually removed from the home screen. Also, the new folder 350 contains the first and second icons 310 and 330 as sub-items. When any user interaction such as a tap or double tap is inputted to open the new folder 350, a list of the first and second icons 310 and 330 in the new folder 350 may be represented on the display unit 100.

As shown in FIG. 3, the new folder 350 may be disposed at the place of the first icon 310. This is case where a folder creating position is defined to an object with higher priority in array between selected objects. If a folder creating position is defined to an object with lower priority in array, the new folder 350 may appear at the place of the second icon 330 and then the first icon 310 moves to and disappears into the new folder 350 by a visual effect. The place of the first icon 310 is therefore changed to an empty place. If a folder creating position is defined to an empty place of the home screen, the new folder 350 may appear at the first empty place 370 among empty places of the home screen. Additionally, if one point (e.g., the first icon 310) of two points selected by a multi-touch interaction moves to the other point (e.g., the second icon 330) through a drag, the new folder 350 may be disposed at the stationary point.

Meanwhile, the control unit 300 may enter into an edit mode for creating a folder. Specifically, when a multi-touch user interaction is inputted as indicated by a reference number 303, the control unit 300 may enter into the edit mode allowing a folder creation and then offer a visual effect showing entrance into the edit mode as indicated by a reference number 315. Namely, if a user interaction input is for a folder creation, edit mode items 390 may be added to respective icons and folders to show the activation of the edit mode. Alternatively, all icons and folders may be changed to a semitransparent form, or any other visual effect may be provided to inform a user that the edit mode is activated. When a user interaction is released in the edit mode, the above-discussed folder creation process may be performed.

Figure 4:
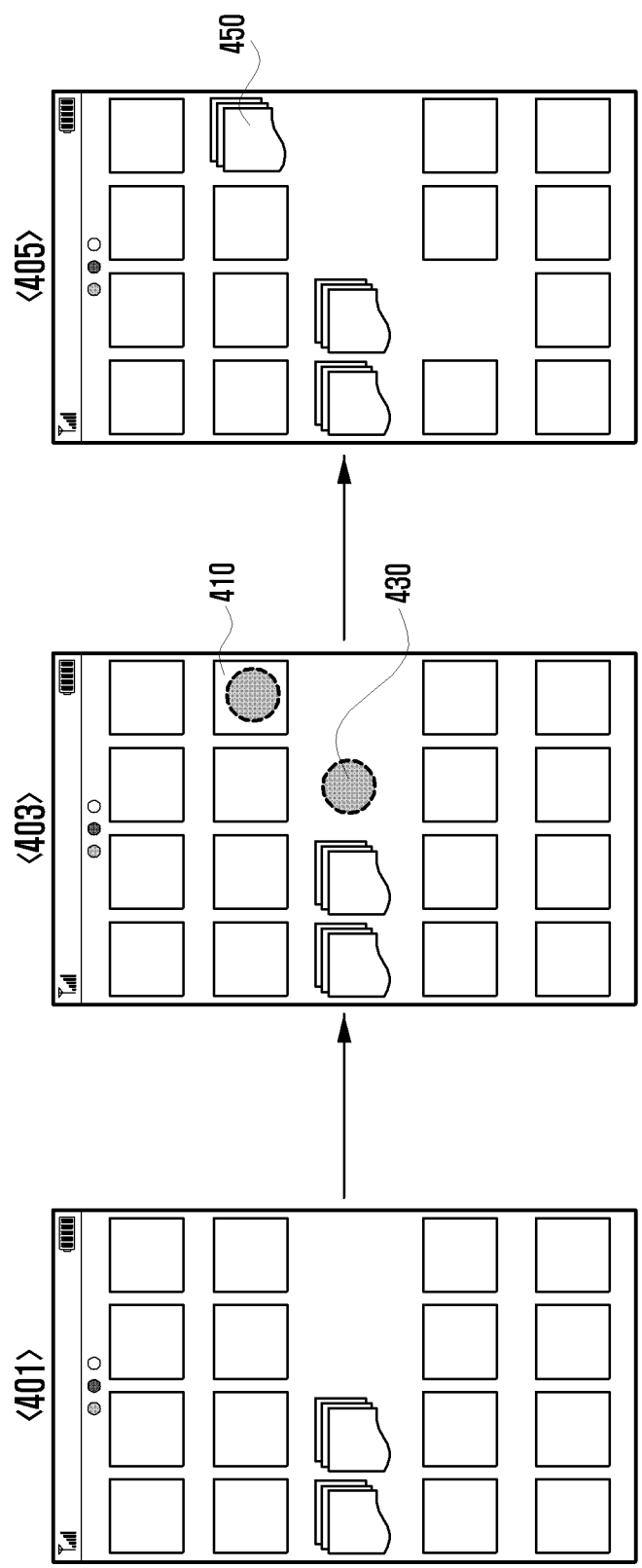

FIG. 4 is a screenshot illustrating another example of creating a folder in response to a touch-based user interaction in a touch-sensitive device in accordance with an exemplary embodiment of the present invention.

As shown in FIG. 4, when a plurality of icons and folders are arranged in a block form on the home screen, a multi-touch user interaction is inputted on at least two objects and thereby a folder is created. In the present invention, two objects selected by a multi-touch user interaction may be two icons, an icon and a folder, two folders, an icon and an empty place, or a folder and an empty place. In FIG. 4 case, objects selected by a multi-touch interaction are an icon and an empty place.

Referring to FIG. 4, the home screen is displayed on the display unit 100 as indicated by a reference number 401. A touch-based user interaction for a folder creation may be inputted on the home screen. For instance, as indicated by a reference number 403, a multi-touch may be inputted on the first icon 410 and an empty place 430. This multi-touch that selects the first icon 410 and the empty place 430 may be held more than a given time and then released.

When a user interaction is detected from the home screen, the control unit 300 creates a folder in response to the user interaction. For instance, as indicated by a reference number 405, a new folder 450 may be created at the place of the first icon 410. At this time, any visual effect as discussed in FIG. 3 may not be provided. Also, without any visual effect, the control unit 300 may dispose the new folder 450 at the place of the first icon 410. Therefore, the new folder 450 contains the first icon 410 as a sub-item. When any user interaction such as a tap or double tap is inputted to open the new folder 450, a list of the first icon 410 in the new folder 450 may be represented on the display unit 100.

As shown in FIG. 4, the new folder 450 may be disposed at the place of the first icon 410. This is case where a folder creating position is defined to an object with higher priority in array between selected objects. If a folder creating position is defined to an object with lower priority in array, the new folder 450 may appear at the empty place 430 and then the first icon 410 moves to and disappears into the new folder 450 by a visual effect. The place of the first icon 410 is therefore changed to an empty place. Although not illustrated in FIG. 4, the control unit 300 may enter into an edit mode as shown in FIG. 3 and then perform the above-discussed folder creation process in the edit mode.

Figure 5:
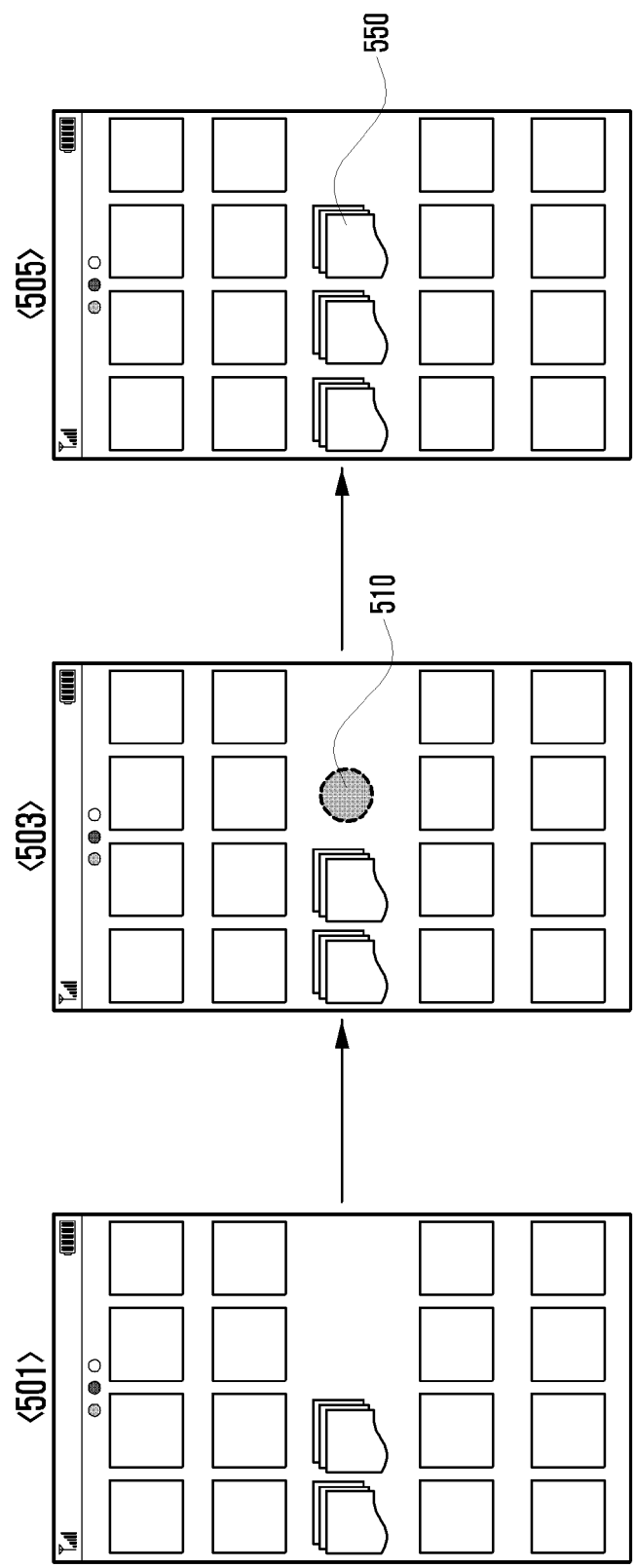

FIG. 5 is a screenshot illustrating still another example of creating a folder in response to a touch-based user interaction in a touch-sensitive device in accordance with an exemplary embodiment of the present invention.

As shown in FIG. 5, when a plurality of icons and folders are arranged in a block form on the home screen, a single-touch user interaction is inputted on a single object and thereby a folder is created. In the present invention, an object selected by a single-touch user interaction may be an icon, a folder, or an empty place. In FIG. 5 case, an object selected by a single-touch interaction is an empty place.

Referring to FIG. 5, the home screen is displayed on the display unit 100 as indicated by a reference number 501. A touch-based user interaction for a folder creation may be inputted on the home screen. For instance, as indicated by a reference number 503, a single-touch may be inputted on an empty place 510. This single-touch that selects the empty place 510 may be held more than a given time and then released.

When a user interaction is detected from the home screen, the control unit 300 creates a folder in response to the user interaction. For instance, as indicated by a reference number 505, a new folder 550 may be created at the empty place 510. At this time, any visual effect as discussed in FIG. 3 may not be provided. Also, since an object selected by a single-touch interaction is an empty place, the control unit 300 may dispose the new folder 550 as an empty folder without any visual effect. Therefore, when any user interaction such as a tap or double tap is inputted to open the new folder 550, a blank page may be represented on the display unit 100.

Although not illustrated in FIG. 5, a single-touch user interaction for a folder creation may be inputted on a specific icon or folder. Also, this single-touch that selects the icon or folder may be held more than a given time and then released. In this case, the control unit 300 may create a group folder that contains the selected icon or folder and then dispose the group folder at the place of the selected icon or folder or at any empty place. Additionally, the control unit 300 may enter into an edit mode and then perform the above-discussed folder creation process in the edit mode.

Figure 6:
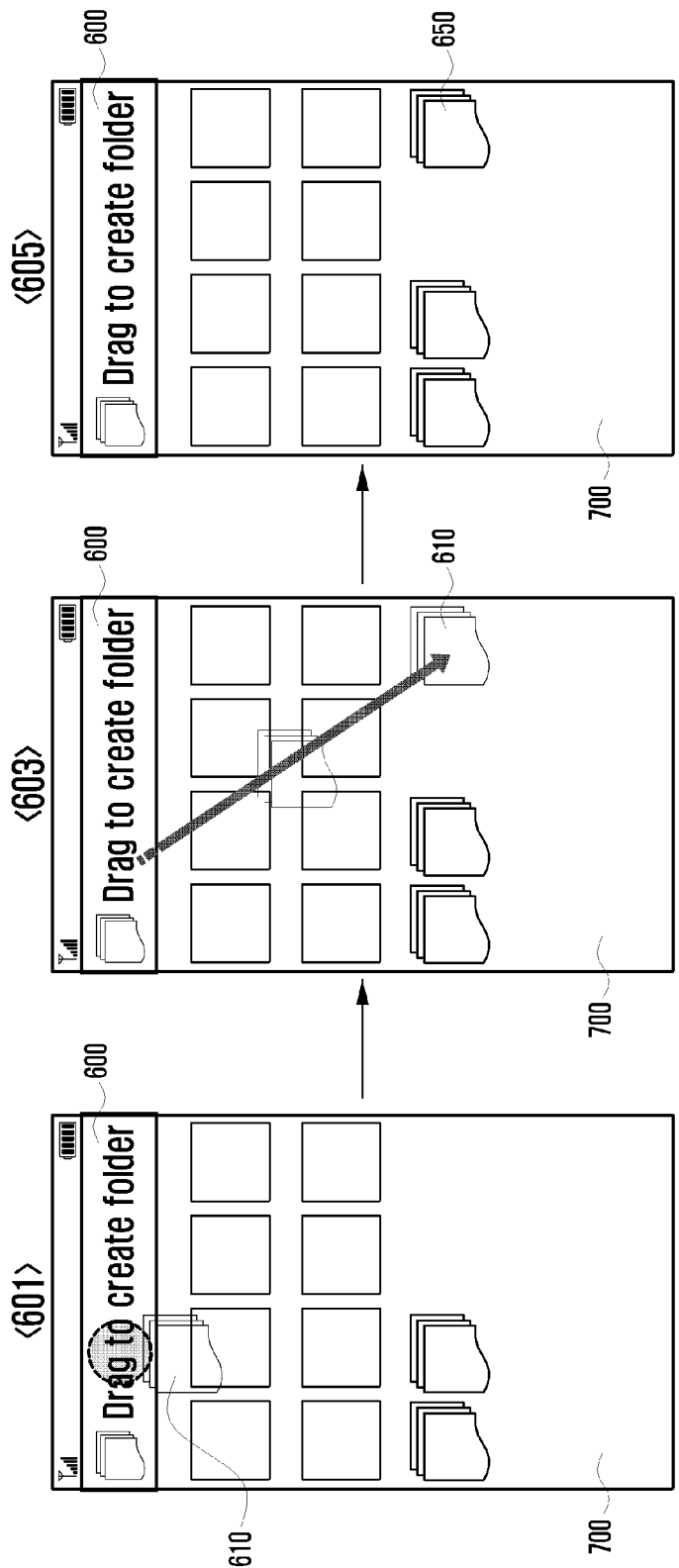

FIG. 6 is a screenshot illustrating still another example of creating a folder in response to a touch-based user interaction in a touch-sensitive device in accordance with an exemplary embodiment of the present invention.

As shown in FIG. 6, a plurality of icons and folders are arranged in a block form on the home screen, and a part of the home is provided as a folder creation region. In FIG. 6 case, an object is the folder creation region, and a folder is created in response to a user interaction using the folder creation region. Therefore, in addition to an icon, a folder, and an empty place having neither icon nor folder, a folder creation region may be further used as an object. Now, a folder creation process based on a user interaction using the folder creation region will be described.

Referring to FIG. 6, the home screen that is composed of a folder creation region 600 and a display region 700 for arranging icons and folders is displayed on the display unit 100 as indicated by a reference number 601. A touch-based user interaction for a folder creation may be inputted on the folder creation region 600 of the home screen. For instance, a single-touch may be inputted on the folder creation region 600 as indicated by a reference number 601, and then moved to the display region 700 through a drag, swing, etc. as indicated by a reference number 603.

When a user interaction is detected from the folder creation region 600, the control unit 300 may visually offer an imaginary folder 610 as indicated by a reference number 601. Then, as indicated by a reference number 603, the control unit 300 may also offer a visual effect by which the imaginary folder 610 moves along a path of the user interaction. For instance, when the user's finger moves from the folder creation region 600 to the display region 700, the imaginary folder 610 may also move together with the finger by a visual effect.

Additionally, the control unit 300 creates a folder in response to the user interaction from the folder creation region 600 to the display region 700. For instance, when a touch is released from any empty place in the display region 700 as indicated by a reference number 603, a new folder 650 may be created at the empty place as indicated by a reference number 605. At this time, since a user interaction is released from an empty place, the control unit 300 may dispose the new folder 650 as an empty folder. Therefore, when any user interaction such as a tap or double tap is inputted to open the new folder 650, a blank page may be represented on the display unit 100.

Although not illustrated in FIG. 6, a user interaction from the folder creation region 600 to the display region 700 may be released from any icon or folder. In this case, the control unit 300 may create a group folder that contains the icon or folder on the release point and then dispose the group folder at the place of the icon or folder or at any empty place. Additionally, the control unit 300 may enter into an edit mode and then perform the above-discussed folder creation process in the edit mode.

Figure 7:
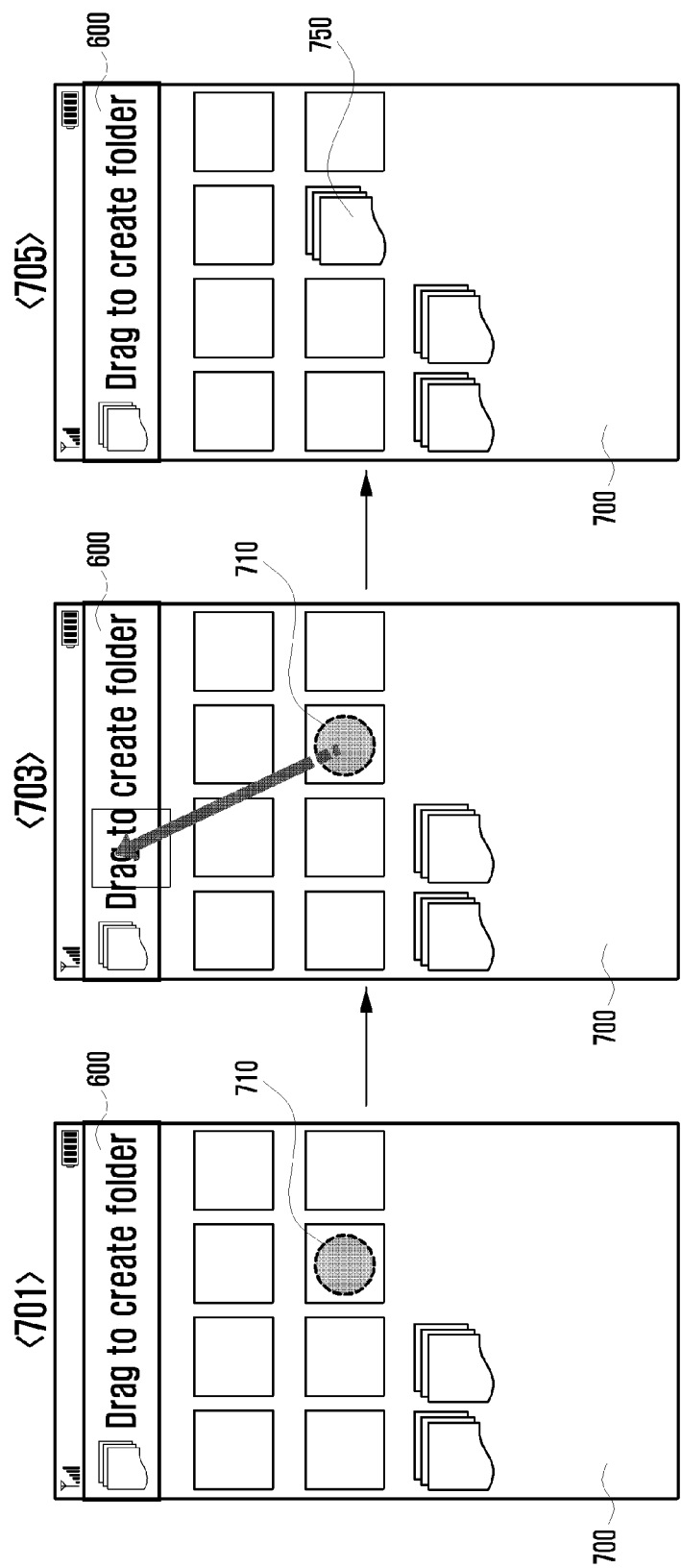

FIG. 7 is a screenshot illustrating still another example of creating a folder in response to a touch-based user interaction in a touch-sensitive device in accordance with an exemplary embodiment of the present invention.

As shown in FIG. 7, a plurality of icons and folders are arranged in a block form on the home screen, and a part of the home is provided as a folder creation region. In FIG. 7 case, an object is the folder creation region, and a folder is created in response to a user interaction using the folder creation region. Now, a folder creation process based on a user interaction using the folder creation region will be described.

Referring to FIG. 7, the home screen that is composed of a folder creation region 600 and a display region 700 for arranging icons and folders is displayed on the display unit 100 as indicated by a reference number 701. A touch-based user interaction for a folder creation may be inputted on any icon or folder in the display region 700 of the home screen. For instance, a single-touch may be inputted on a selected icon 710 in the display region 700 as indicated by a reference number 701, and then moved to the folder creation region 600 through a drag, swing, etc. as indicated by a reference number 703.

When a user interaction is detected from the display region 700 to the folder creation region 600, the control unit 300 may offer a visual effect by which the selected icon 710 moves along a path of the user interaction as indicated by a reference number 703. For instance, when the user's finger moves from the selected icon 710 to the folder creation region 600, the selected icon 710 may also move together with the finger by a visual effect.

Additionally, the control unit 300 creates a folder in response to the user interaction from the display region 700 to the folder creation region 600. For instance, when a touch is released from the folder creation region 600 as indicated by a reference number 703, a new folder 750 may be created at the place of the selected icon 710 as indicated by a reference number 705. At this time, according as the icon 710 is selected and moved to the folder creation region 600 in response to a user interaction, the control unit 300 may create and dispose the new folder 750 as a group folder containing the selected icon 710. Therefore, when any user interaction such as a tap or double tap is inputted to open the new folder 750, a list of the icon 710 in the new folder 750 may be represented on the display unit 100.

Although not illustrated in FIG. 7, a user interaction may start from an empty place in the display region 700 and be released from the folder creation region 600. In this case, the control unit 300 may create an empty folder and then dispose the empty folder at the start place or at any other empty place with the highest priority. Additionally, the control unit 300 may enter into an edit mode and then perform the above-discussed folder creation process in the edit mode.

Figure 8:
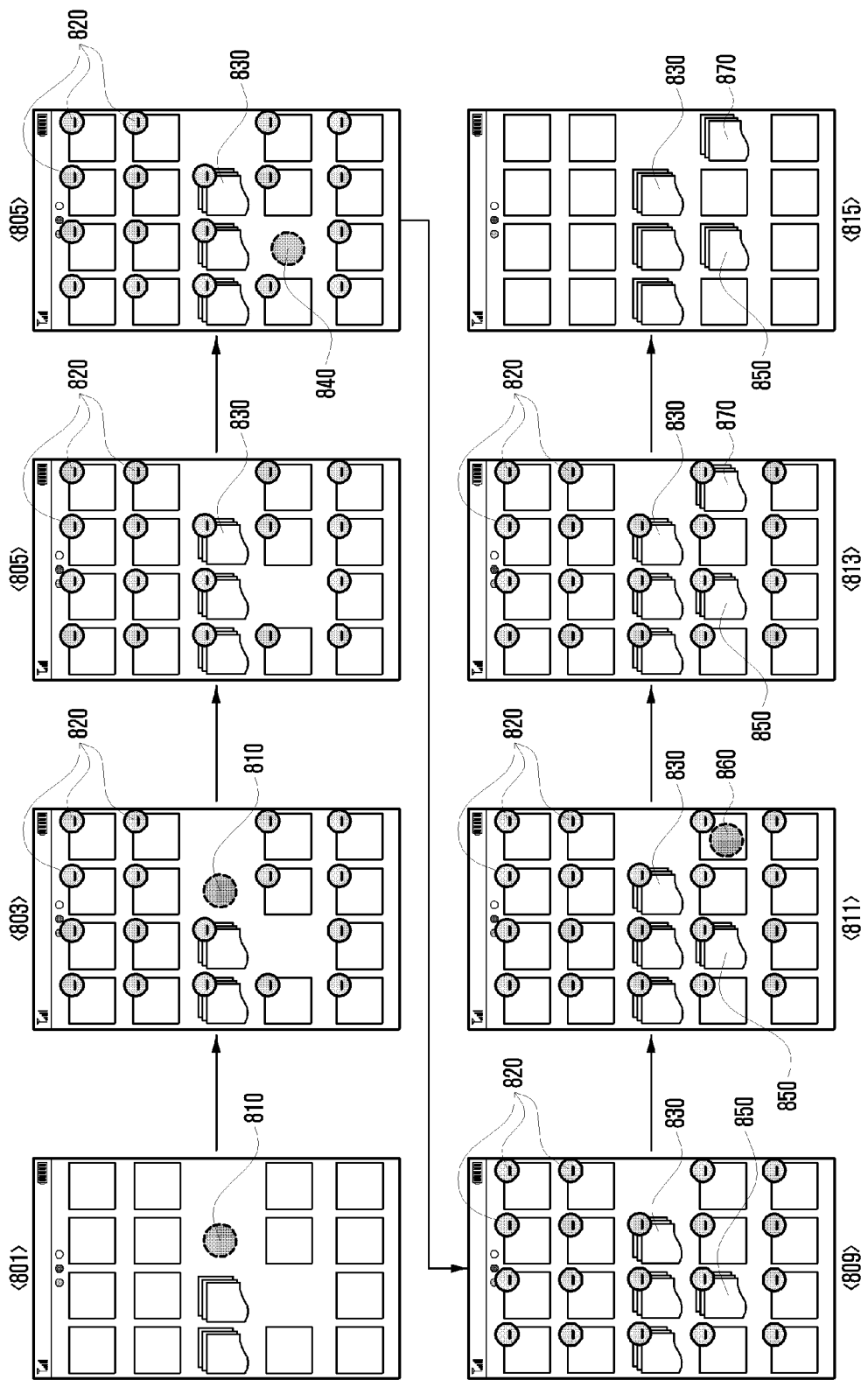

FIG. 8 is a screenshot illustrating still another example of creating a folder in response to a touch-based user interaction in a touch-sensitive device in accordance with an exemplary embodiment of the present invention.

As shown in FIG. 8, when a plurality of icons and folders are arranged in a block form on the home screen, an edit mode initiates in response to the first user interaction and, in the edit mode, a folder is created in response to the second user interaction inputted on a single object. In FIG. 8 case, an object selected by a single-touch user interaction may be an icon, a folder, or an empty place.

Referring to FIG. 8, the home screen is displayed on the display unit 100 as indicated by a reference number 801. A touch-based user interaction for a folder creation may be inputted on the home screen. For instance, as indicated by a reference number 801, a single-touch may be inputted on an empty place 810. This single-touch that selects the empty place 810 may be held more than a given time (namely a touch-and-hold). Alternatively, such a single-touch user interaction may be inputted on any icon or folder instead of the empty place 810.

When a user interaction is detected from the home screen, the control unit 300 enters into an edit mode as indicated by a reference number 803 and then offers a visual effect. For example, edit mode items 820 shows that entrance into the edit mode may be added on respective icons and folders.

In the edit mode, the user interaction may be released from the empty place 810. Then the control unit 300 detects a release of the user interaction and therefore, as indicated by a reference number 805, creates a new folder 830 at the empty place 810 where the user interaction occurs.

Thereafter, in the edit mode, another user interaction such as a tap may be inputted on another empty place 840 as indicated by a reference number 807. Then the control unit 300 detects an input of the user interaction on the empty place 840 and therefore, as indicated by a reference number 809, creates the second new folder 850 at the empty place 840. Namely, as indicated by reference numbers 801 to 809, the first user interaction (a long touch and release) causes an entrance into the edit mode and a creation of the first new folder 810, and the second user interaction (a tap) in the edit mode causes a creation of the second new folder 850. In this case, new folders 830 and 850 created at empty places are empty folders having no icon (or folder).

Additionally, in the edit mode, further another user interaction such as a tap may be inputted on any icon 860 (or folder) as indicated by a reference number 811. Then the control unit 300 detects an input of the user interaction on the icon 860 (or folder) and therefore, as indicated by a reference number 813, creates the third new folder 870 at the place of the selected icon 860 (or folder). This folder 870 created at the icon 860 (or folder) is a group folder having the icon 860 (or folder).

The edit mode may be canceled in response to a predefined user interaction such as a press of a cancel key or any touch-based predefined input. Then the control unit 300 removes the edit mode items 820 from the home screen as indicated by a reference number 815.

Therefore, the above new folders 830, 850 and 870 are displayed on the home screen. Specifically, the first and second new folders 830 and 850 created in response to user interactions on empty places are formed as empty folders, and the third new folder 870 created in response to a user interaction on any icon or folder is formed as a group folder having the icon or folder.

Although not illustrated in FIG. 8, the above-discussed folder creation process may be performed without entering into the edit mode.

Figure 9:
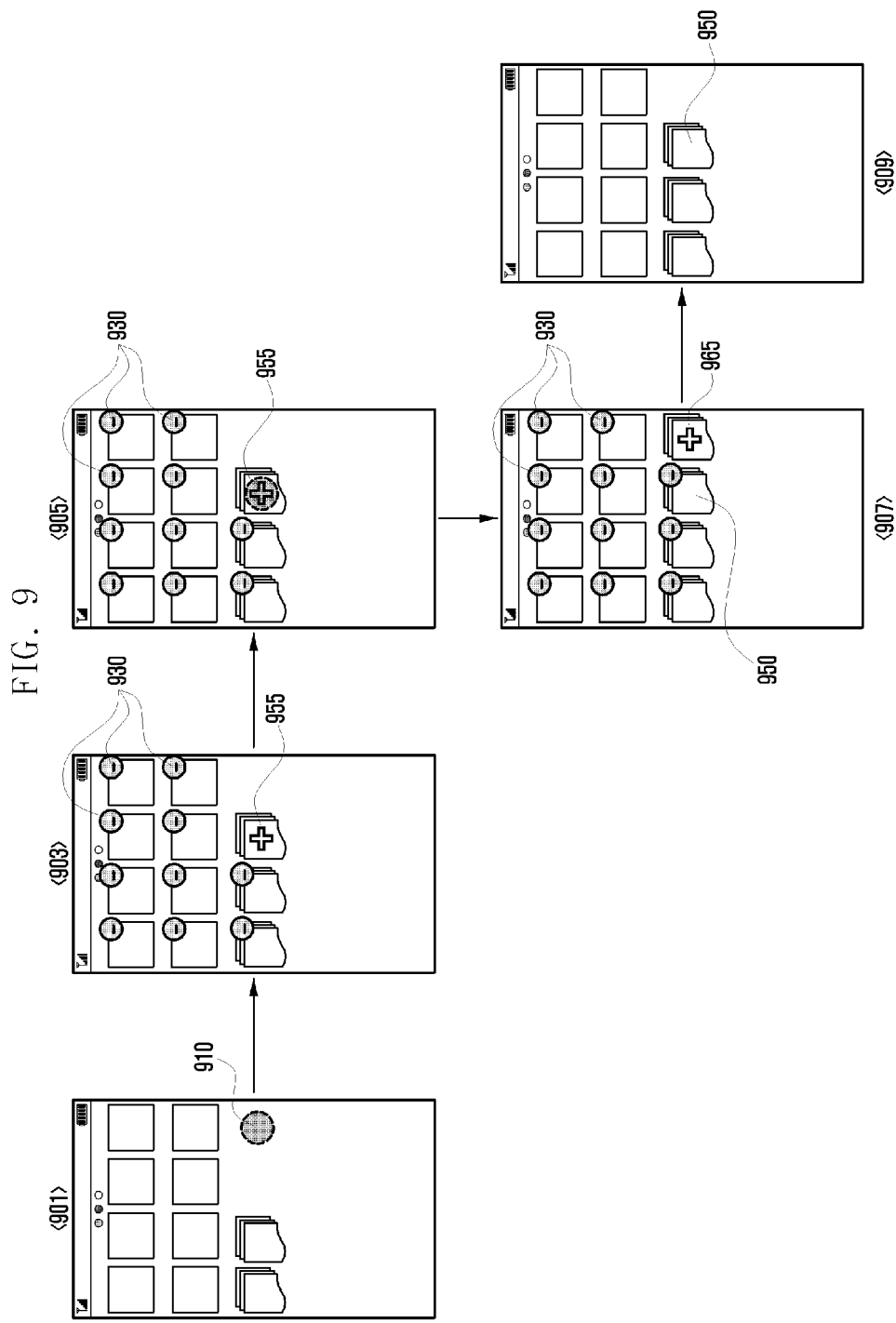

FIG. 9 is a screenshot illustrating still another example of creating a folder in response to a touch-based user interaction in a touch-sensitive device in accordance with an exemplary embodiment of the present invention.

As shown in FIG. 9, when a plurality of icons and folders are arranged in a block form on the home screen, a user interaction is inputted on a single object and then a new folder is created in response to the user interaction. In FIG. 9 case, an object selected by a single-touch user interaction may be an icon, a folder, or an empty place. Particularly, FIG. 9 case may further use a ghost folder when creating a new folder after entering into an edit mode.

Referring to FIG. 9, the home screen is displayed on the display unit 100 as indicated by a reference number 901. A touch-based user interaction for a folder creation may be inputted on the home screen. For instance, as indicated by a reference number 901, a single-touch may be inputted on an empty place 910. This single-touch that selects the empty place 910 may be held more than a given time and then released. Alternatively, such a single-touch user interaction may be inputted on any icon or folder instead of the empty place 910.

When a user interaction is detected from the home screen, the control unit 300 enters into an edit mode as indicated by a reference number 903 and then offers a visual effect. For instance, edit mode items 930 showing entrance into the edit mode may be added on respective icons and folders.

Additionally, as indicated by a reference number 903, the control unit 300 may create a ghost folder 955 in the edit mode. The edit mode item 930 may not be added to the ghost folder 955 until the ghost folder 955 is changed to a complete new folder 950 in the edit mode. In this disclosure, a ghost folder refers to a kind of imaginary folder, not actually created. This ghost folder is offered in a semitransparent form. As will be described below, the ghost folder is changed to a complete new folder when a user interaction occurs on the ghost folder.

Next, another touch-based user interaction may be inputted on the ghost folder 955 in order to create a new folder. For instance, as indicated by a reference number 905, a single-touch user interaction such as a tap may be inputted on the ghost folder 955.

Then the control unit 300 detects the user interaction on the ghost folder 955 and therefore, as indicated by a reference number 907, creates a new folder 950 by changing the ghost folder 955 to the new folder 950. In FIG. 9 case, the new folder 950 created in response to the user interaction on the ghost folder 955 is an empty folder. Therefore, when any user interaction such as a tap or double tap is inputted to open the new folder 950, a blank page may be represented on the display unit 100.

Additionally, as indicated by a reference number 907, a new ghost folder 965 may be offered when the ghost folder 955 is changed to the new folder 950. Also, an edit mode item may be added to the new folder 950. The position of the new ghost folder 965 may be an empty place with the highest priority in array among empty places of the home screen.

The edit mode may be canceled in response to a predefined user interaction such as a suitable menu manipulation or a touch-and-hold on any empty place.

The control unit 300 detects the user interaction for canceling the edit mode and then, as indicated by a reference number 909, removes the edit mode items 930 from the home screen. Furthermore, the control unit 300 removes the ghost folder 965 offered in the edit mode and displays the new folder 950 changed from the ghost folder.

Although not illustrated in FIG. 9, the above-discussed folder creation process may be performed without entering into the edit mode.

Figure 10:
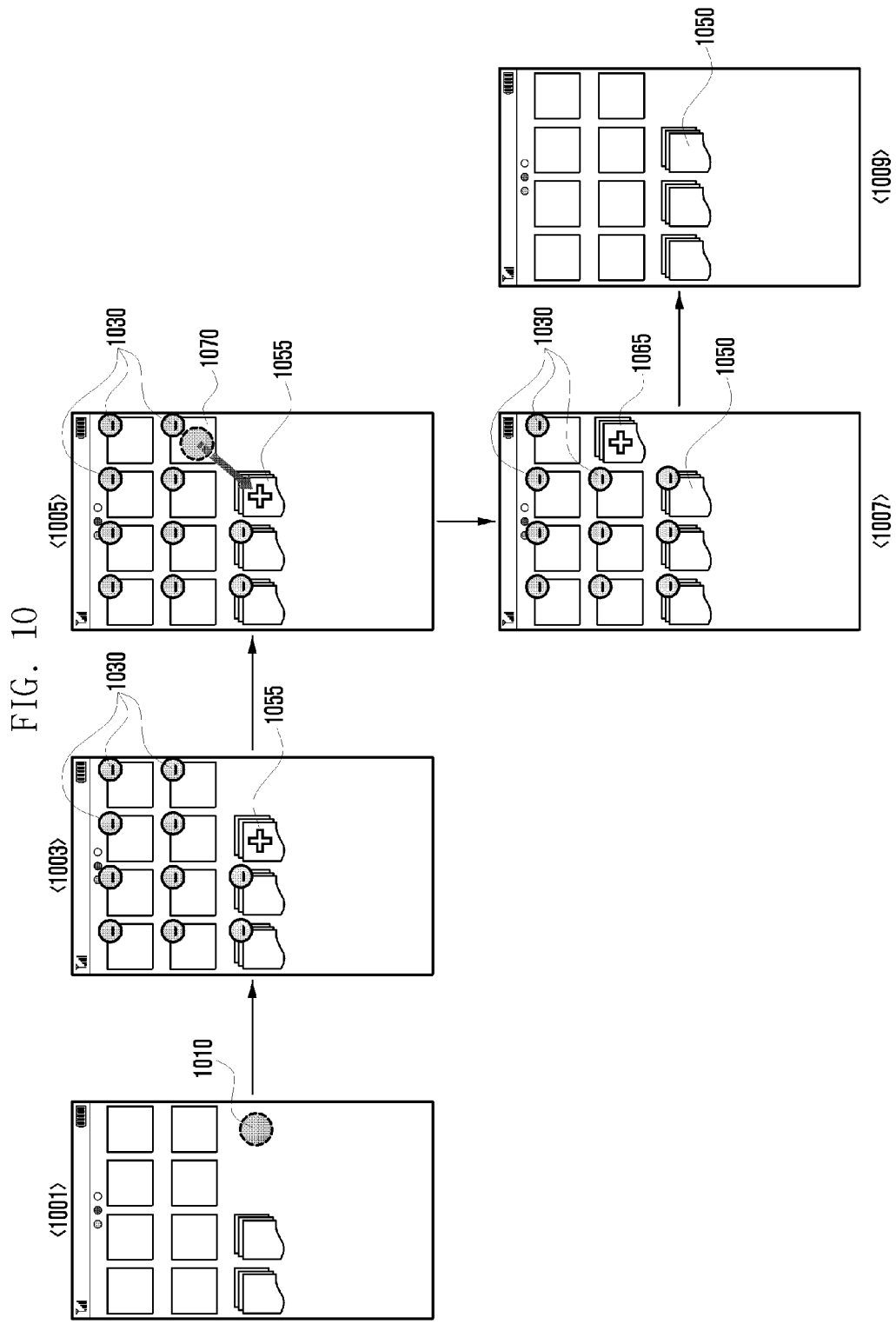

FIG. 10 is a screenshot illustrating still another example of creating a folder in response to a touch-based user interaction in a touch-sensitive device in accordance with an exemplary embodiment of the present invention.

As shown in FIG. 10, when a plurality of icons and folders are arranged in a block form on the home screen, a user interaction is inputted on a single object and then a new folder is created in response to the user interaction. In FIG. 10 case, an object selected by a single-touch user interaction may be an icon, a folder, or an empty place. Particularly, FIG. 10 case may further use a ghost folder when creating a new folder after entering into an edit mode.

Referring to FIG. 10, the home screen is displayed on the display unit 100 as indicated by a reference number 1001. A touch-based user interaction for a folder creation may be inputted on the home screen. For instance, as indicated by a reference number 1001, a single-touch may be inputted on an empty place 1010. This single-touch that selects the empty place 1010 may be held more than a given time and then released. Alternatively, such a single-touch user interaction may be inputted on any icon or folder instead of the empty place 1010.

When a user interaction is detected from the home screen, the control unit 300 enters into an edit mode as indicated by a reference number 1003 and then offers a visual effect. For instance, edit mode items 1030 showing entrance into the edit mode may be added on respective icons and folders.

Additionally, as earlier discussed in FIG. 9 case, the control unit 300 may create a ghost folder 1055 in the edit mode. The edit mode item 1030 may not be added to the ghost folder 1055 until the ghost folder 1055 is changed to a complete new folder 1050 in the edit mode. As will be described below, the ghost folder is changed to a complete new folder when a user interaction occurs on the ghost folder.

Next, another touch-based user interaction may be inputted on any icon (or folder) in order to create a new folder. For instance, as indicated by a reference number 1005, any icon 1070 may be selected through a touch and then moved to the ghost folder 1055 through a drag, swing, etc. Namely, a single-touch user interaction may be inputted. However, two or more icons or folders may be selected and moved to the ghost folder 1055.

Then the control unit 300 detects the user interaction for moving the selected icon (or folder) to the ghost folder 1055 and therefore, as indicated by a reference number 1007, creates a new folder 1050 by changing the ghost folder 1055 to the new folder 1050. In FIG. 10 case, the new folder 1050 created in response to the user interaction on the icon 1070 is a group folder having the icon 1070. Therefore, when any user interaction such as a tap or double tap is inputted to open the new folder 1050, a list of the icon 1070 may be represented on the display unit 100.

Additionally, as indicated by a reference number 1007, a new ghost folder 1065 may be offered when the ghost folder 1055 is changed to the new folder 1050. Also, an edit mode item may be added to the new folder 1050. The position of the new ghost folder 1065 may be an empty place with the highest priority in array among empty places of the home screen. In FIG. 10 case, since the icon 1070 is moved to the new folder 1050, the new ghost folder 1065 may be offered at an empty place from which the icon 1070 is moved.

The edit mode may be canceled in response to a predefined user interaction such as a suitable menu manipulation or a touch-and-hold on any empty place.

The control unit 300 detects the user interaction for canceling the edit mode and then, as indicated by a reference number 1009, removes the edit mode items 1030 from the home screen. Furthermore, the control unit 300 removes the ghost folder 1065 offered in the edit mode and displays the new folder 1050 changed from the ghost folder.

Although not illustrated in FIG. 10, the above-discussed folder creation process may be performed without entering into the edit mode.

Figure 11:
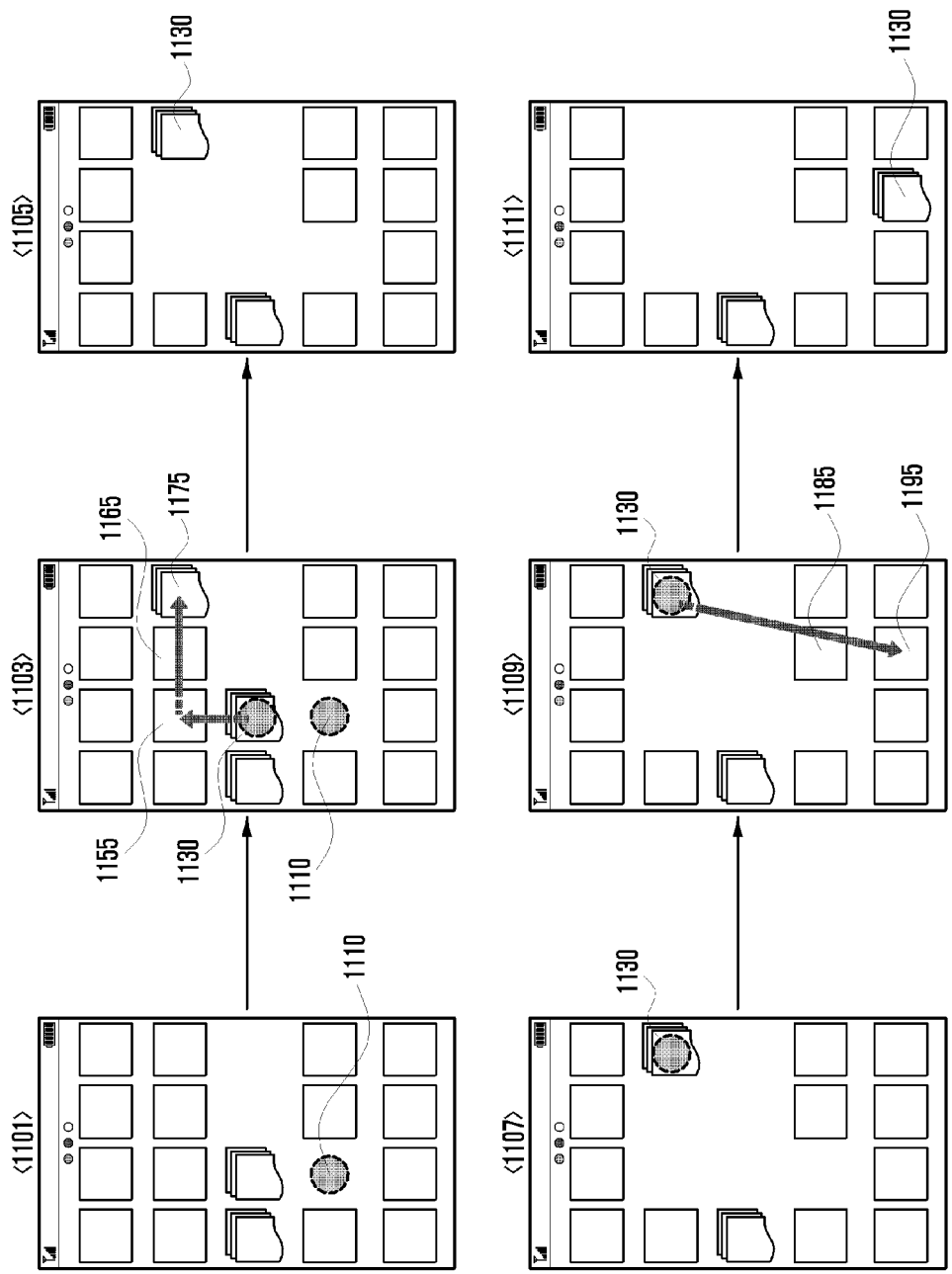
FIGS. 11 and 12 are screenshots illustrating examples of controlling a folder in a touch-sensitive device in accordance with exemplary embodiments of the present invention.

FIG. 11 is a screenshot illustrating an example of controlling a folder in a touch-sensitive device in accordance with an exemplary embodiment of the present invention.

As shown in FIG. 11, when a plurality of icons and folders are arranged in a block form on the home screen, a selected icon or folder is added to a specific folder. Namely, in FIG. 11 case, at least one icon or folder arranged on the home screen may be absorbed into a specific folder by moving the folder through a single-touch or multi-touch user interaction.

First, a process of adding a plurality of icons to a folder by moving the folder through a multi-touch user interaction will be described hereinafter.

Referring to FIG. 11, the home screen is displayed on the display unit 100 as indicated by a reference number 1101. A touch-and-hold may be inputted as the first touch-based user interaction on any place (e.g., an empty place 1110) of the home screen. Additionally, a touch-and-drag may be inputted as the second touch-based user interaction on any folder 1130 to which a selected icon will be added. Namely, while the first user interaction occurs by keeping a touch on the empty place 1110, the second user interaction occurs by touching the selected folder 1130 and then moving the folder 1130 to another folder 1175 via selected icons 1155 and 1165.

The control unit 300 may detect the first and second user interactions (namely a multi-interaction) and thereby add any icon or folder located on a path of the second user interaction to the moving folder 1130. Namely, as indicated by reference numbers 1103 and 1105, the icons 1155 and 1165 and the folder 1175 on a path of the second user interaction are absorbed into the moving folder 1130 and disappear from the home screen by a visual effect. Therefore, the folder 1130 contains the icons 1155 and 1165 and the folder 1175 as sub-items. When any user interaction such as a tap or double tap is inputted to open the folder 1130, a list of the icons 1155 and 1165 and the folder 1175 absorbed into the folder 1130 may be represented on the display unit 100.

Meanwhile, the first user interaction may be released while the first user interaction is maintained. Namely, without the first user interaction, the folder 1130 may move through the second user interaction. In this case, any icon or folder on a path of the second user interaction may not be added to the moving folder 1130. If the first user interaction occurs again during a move of the folder 1130 by the second user interaction, any icon or folder on a path of the second user interaction may be added to the moving folder 1130.

Next, a process of adding any icon to a folder by moving the folder through a single-touch user interaction will be described hereinafter.

Referring again to FIG. 11, a touch-and-drag may be inputted as a touch-based user interaction on any folder 1130 to which a selected icon will be added. Namely, the folder 1130 is touched as indicated by a reference number 1107 and then moved to any icon 1195 through a drag, swing, etc. as indicated by a reference number 1109.

The control unit 300 may detect the above user interaction (namely a single-interaction) and thereby add any icon or folder located at a release point of the user interaction to the moving folder 1130. Namely, as indicated by reference numbers 1109 and 1111, an icon 1195 at a release point of the user interaction is absorbed into the moving folder 1130 and disappears from the home screen by a visual effect. Also, the position of the folder 1130 is changed to the place of the icon 1195. Therefore, the folder 1130 contains the icon 1195 as a sub-item. Further referring to the above-discussed reference numbers 1101 to 1105, the folder 1130 may have four sub-items, namely the icons 1155, 1165 and 1195 and the folder 1175.

Meanwhile, any icon or folder located on a path, not at a release point, of the single-interaction may not be added to the moving folder 1130. For instance, as indicated by reference numbers 1109 and 1111, an icon 1185 located on a path of the user interaction is not added to the folder 1130.

Figure 12:
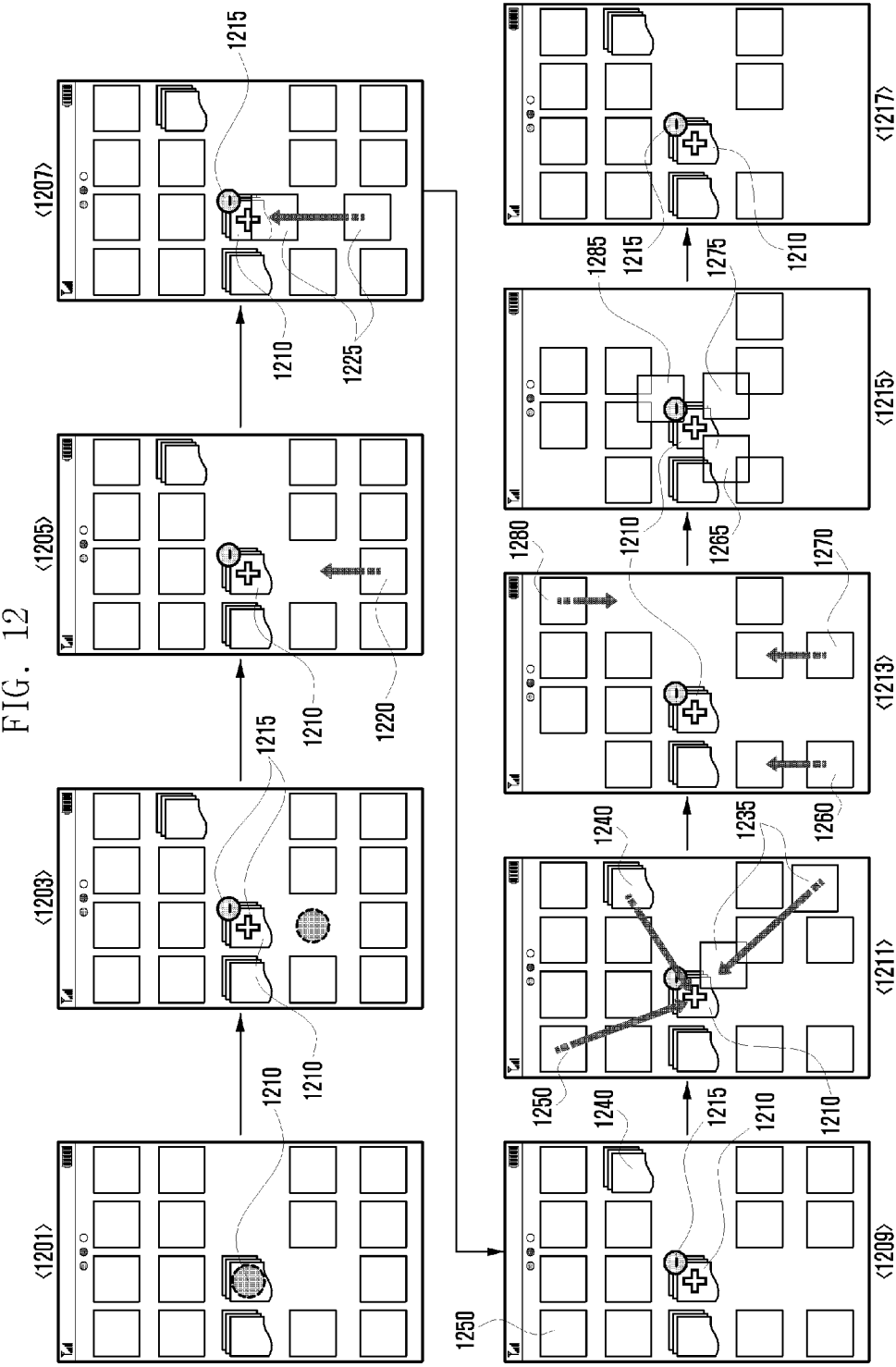

FIG. 12 is a screenshot illustrating another example of controlling a folder in a touch-sensitive device in accordance with exemplary an embodiment of the present invention.

As shown in FIG. 12, when a plurality of icons and folders are arranged in a block form on the home screen, a selected icon or folder is added to a specific folder. Namely, in FIG. 12 case, at least one icon or folder arranged on the home screen may be absorbed into a specific folder by touching the icon or folder with the finger (or stylus pen) and then flicking the touched icon or folder.

Referring to FIG. 12, the home screen is displayed on the display unit 100 as indicated by a reference number 1201. The first user interaction such as a tap may be inputted on a selected folder 1210 in the home screen in order to activate the selected folder 1210. Then, as indicated by a reference number 1203, the control unit 300 may activate the selected folder 1210 and offer a visual effect to the activated folder. As an example of a visual effect, the control unit 300 may add a predefined item 1215 to the folder 1210 in order to distinguish the activated folder 1210 from the others.

Next, the second user interaction such as a flick may be inputted on any icon 1220 (or folder) to be added to the activated folder 1210. For instance, as indicated by a reference number 1205, the selected icon 1220 may be flicked upward along the home screen.

Then the control unit 300 may offer a visual effect as if the selected icon 1220 is blown upward as indicated by a reference number 1207. Also, this icon 1220 may run toward the activated folder 1210 regardless of a flick direction. And also, this icon 1220 may be changed to a semitransparent icon 1225 when leaving the original position.

When the icon 1220 arrives at the activated folder 1210, the icon 1220 is absorbed into the activated folder 1210 and disappears from the home screen by a visual effect as indicated by a reference number 1209. Therefore, the folder 1210 becomes a group folder that contains the icon 1220.

Similarly, as indicated by a reference number 1211, each of an icon 1235, a folder 1240, and an icon 1250 may be further moved to the activated folder 1210. At this time, a visual effect may be offered as if these icons 1235 and 1250 and folder 1240 are blown to the activated folder 1210.

Meanwhile, as indicated by a reference number 1213, a plurality of icons 1260, 1270 and 1280 may be simultaneously selected through a multi-touch and then moved at a time. For instance, two icons 1260 and 1270 may be selected with left fingers, and one icon 1280 may be selected with a right finger. Then two icons 1260 and 1270 may be flicked upward along the home screen, and one icon 1280 may be flicked downward.

The control unit 300 may offer a visual effect as if the selected icons 1260, 1270 and 1280 are blown toward the activated folder 1210 as indicated by a reference number 1215. Also, these icons 1260, 1270 and 1280 may run toward the activated folder 1210 regardless of a flick direction. And also, these icons 1260, 1270 and 1280 may be changed to semitransparent icons 1265, 1275 and 1285 when leaving the respective original positions.

When the icons 1260, 1270 and 1280 arrive at the activated folder 1210, these icons 1260, 1270 and 1280 are absorbed into the activated folder 1210 and disappear from the home screen by a visual effect as indicated by a reference number 1217. Therefore, the folder 1210 becomes a group folder that contains these icons 1260, 1270 and 1280.

FIG. 13 is a screenshot illustrating an example of offering information about a created folder in a touch-sensitive device in accordance with an exemplary embodiment of the present invention.

Referring to FIG. 13, new folders are created using the first icon 1310 and the second icon 1330, for example, as indicated by a reference number 1301. Particularly, each of the first and second icons 1310 and 1330 may be represented as a specific image showing the characteristic of each application.

Next, as indicated by a reference number 1303, any user interaction using the first and second icons 1310 and 1330 is inputted as discussed above, and the control unit 300 creates a new folder in response to the user interaction and then visually disposes the new folder at a specific place on the home screen. As indicated by reference numbers 1305 and 1307, the new folder 1350 may be disposed at the place of the first icon 1310, depending on priorities of the first and second icons 1310 and 1330 in array. Meanwhile, the new folder 1350 may be created in the edit mode as indicated by a reference number 1305 or may be created without entering into edit mode as indicated by a reference number 1307.

When the created folder is represented, the control unit 300 may offer information about the created folder. Namely, the control unit 300 may select a representative image among images of the first and second icons 1310 and 1330 and offer the selected image as folder information. For instance, as indicated by reference numbers 1305 and 1307, an image of the first icon 1310 may be selected as a representative image 1370 of the created folder.

The selection of the representative image may depend on priorities of icons in array. Alternatively, an icon of the most recently used application or most frequently used application may used as the representative image.

Additionally, in the edit mode as indicated by a reference number 1305, numeral information 1390 that indicates the number of icons and folders constituting the created folder may be further offered as folder information. When the edit mode is canceled, the numeral information 130 may be removed from display. However, in any cases other than the edit mode, as indicated by a reference number 1307, the numeral information may be offered together with the representative image. Namely, folder information may include anytime the representative image and numeral information.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method comprising:
   detecting a touch input on a screen of a touch sensitive device;
   creating a new folder when the touch input is in accordance with a predefined folder creation rule;
   in response to detecting a first touch input, detecting whether the first touch input is disposed on an empty portion of the screen or on a displayed folder;
   when the first touch input is detected on the empty portion of the screen:
      detecting whether a second touch input designates selection of the displayed folder; and when the second touch input designates selection of the displayed folder, detecting a movement of the second touch input moving the selected displayed folder along a movement path over at least one object while the first touch input is maintained on the empty portion of the screen to store in the displayed folder any object located on the movement path of the displayed folder; and
   when the first touch input is detected on the displayed folder:
      detecting a movement of the first touch input designating a second movement path of the displayed folder and storing in the displayed folder an object located at a termination point of the second movement path, such that any objects located along the second movement path away from the termination point are not added to the displayed folder.

2. The method according to claim 1, further comprising visually disposing the new folder at a specific location on the screen.

3. The method of claim 2, wherein the new folder is visually disposed at an empty place on the screen having a highest priority among an array of empty places of the screen.

4. The method of claim 2, wherein the new folder is visually disposed at a place on the screen where the first touch input was detected.

5. The method of claim 1, wherein the at least one object located on the moving path of the displayed folder comprises an icon or another folder.

6. The method of claim 5, wherein creating the new folder further includes creating a group folder having the icon or contents of the another folder.

7. The method of claim 1, wherein the touch input is detected on the empty portion of the screen for a predetermined time in accordance with the folder creation rule, and the new folder comprises an empty folder visually disposed at the empty portion of the screen.

8. The method of claim 1, further comprising:
selecting a representative image when creating the new folder, and displaying the representative image on the new folder.

9. The method of claim 8, wherein the representative image further includes numeral information indicating a number of icons within the new folder.

10. The method of claim 1, further comprising:
when the touch input is detected on the empty portion of the screen for a predetermined time in accordance with the folder creation rule, entering into an edit mode and displaying a ghost folder in the edit mode,
wherein when an icon is dragged to the ghost folder the new folder is created storing the dragged icon.

11. The method of claim 10, further comprising:
creating the new folder when the ghost folder is selected by a third touch input.

12. The method of claim 11, wherein the ghost folder is displayed at an empty portion of the screen.

13. The method of claim 12, wherein:
the ghost folder is changed into the new folder in response to the third input; and
a new ghost folder is generated at another empty place of the screen.

14. The method of claim 1, further comprising:
when the first touch input is detected on a first icon, detecting whether the second touch input designates a second icon;
when the second touch input designates the second icon, generating the new folder including the first icon at a location of the first icon; and
displaying movement of the second icon to the new folder and storing the second icon in the new folder.

15. The method of claim 1, wherein the first touch input is detected on the empty portion of the screen, the method further comprising:
while the selected displayed folder moves along the movement path, terminating storage of any object located on the movement path of the displayed folder in response to detecting release of the first touch input, and
after detecting release of the first touch input, recommencing storage of any object located on the movement path of the displayed folder in response to detecting reapplication of the first touch input on the empty portion of the screen.

16. A touch-sensitive device comprising:
a touch screen; and
a control unit to:
detect a touch input on the touch screen,
create a new folder when the touch based input is in accordance with a predefined folder creation rule,
in response to detecting a first touch input, detect whether the first touch input is disposed on an empty portion of the screen or on a displayed folder,
when the first touch input is detected on the empty portion of the touch screen:
detect whether a second touch input designates selection of the displayed folder, and when the second touch input designates selection of the displayed folder, detect a movement of the second touch input moving the selected displayed folder along a movement path over at least one object while the first touch input is maintained on the empty portion of the screen to store in the displayed folder any object located on the movement path of the displayed folder, and
when the first touch input is detected on the displayed folder:
detecting a movement of the first touch input designating a second movement path of the displayed folder and store in the displayed folder an object located at a termination point of the second movement path, such that any objects located along the second movement path away from the termination point are not added to the displayed folder.

17. The touch sensitive device according to claim 16, wherein the touch input is detected on the empty portion of the screen for a predetermined time in accordance with the folder creation rule, and the new folder comprises an empty folder visually disposed at the empty portion of the screen.

18. The touch sensitive device according to claim 16, the control unit to further:
when the touch input is detected on the empty portion of the screen for a predetermined time, enter into an edit mode and display a ghost folder in the edit mode; and
wherein when an icon is dragged to the ghost folder, the new folder is created storing the dragged icon.

19. The touch sensitive device according to claim 16, the control unit to further:
when the first touch input is detected on a first icon, detect whether the second touch input designates a second icon;
when the second touch input designates the second icon, generate the new folder including the first icon at a location of the first icon; and
display movement of the second icon to the new folder and store the second icon in the new folder.

20. The touch-sensitive device of claim 16, wherein the first touch input is detected on the empty portion of the screen, the control unit further:
while the selected displayed folder moves along the movement path, terminating storage of any object located on the movement path of the displayed folder in response to detecting release of the first touch input; and
after detecting release of the first touch input, recommencing storage of any object located on the movement path of the displayed folder in response to detecting reapplication of the first touch input on the empty portion of the screen.

* * * * *